United States Patent [19]
Hawes

[11] 3,864,693
[45] Feb. 4, 1975

[54] STRIP CHART RECORDING MECHANISM

[76] Inventor: Edward M. Hawes, 32418 Berkshire, Saint Clair Shores, Mich. 48082

[22] Filed: July 10, 1973

[21] Appl. No.: 377,988

Related U.S. Application Data

[62] Division of Ser. No. 286,640, Sept. 6, 1972, Pat. No. 3,797,301.

[52] U.S. Cl. ............... 346/125, 346/138, 346/139 B
[51] Int. Cl. ........................ G01d 9/38, G01d 15/28
[58] Field of Search ...... 346/138, 125, 33 R, 139 B, 346/140; 73/84, 94, 88 E; 354/98, 94

[56] References Cited
UNITED STATES PATENTS

| | | | |
|---|---|---|---|
| 439,121 | 10/1890 | Crane | 354/98 |
| 957,257 | 5/1910 | Robinson et al. | 346/138 X |
| 2,215,542 | 9/1940 | Chappell et al. | 346/139 B X |
| 2,406,764 | 9/1946 | Guillemin | 346/139 B X |
| 2,973,237 | 2/1961 | Whiteley | 346/140 X |
| 3,130,931 | 4/1964 | Hautly | 346/138 UX |
| 3,552,194 | 1/1971 | Hawes | 73/84 |

*Primary Examiner*—Joseph W. Hartary
*Attorney, Agent, or Firm*—E. Kelly; H. Berl; J. Schmidt

[57] ABSTRACT

A strip-chart recording means wherein a marking stylus is moved over a strip chart carried on a rotary drum; the stylus is moved translationally parallel to the drum axis by a first condition to be recorded, and the drum is moved rotationally about its axis by a second condition to be recorded. The stylus movement is magnified by motion transmission means that includes separate flexible tension elements, such as cords trained over different diameter pulleys. Internal strip chart storage spools are carried on a removable cover closing one end of the drum; the cover and spools are removable as a unit to remove the marked chart and to insert a new chart strip.

2 Claims, 10 Drawing Figures

STRIP CHART RECORDING MECHANISM

This is a division, of application Ser. No. 286,640, filed Sept. 6, 1972 now U.S. Pat. No. 3,797,301.

The invention described herein may be manufactured, used, and licensed by or for the Government for governmental purposes without payment to me of any royalty thereon.

BACKGROUND OF THE INVENTION

1. Field of the Invention

The invention relates to means for measuring soil characteristics, especially to means to determine the shear strength of soils as a function of the load imposed on the soil. Soil characteristics are of interest to architects, highway engineers, builders of dams and levees, transportation engineers, rivers and harbors scientists, argicultural engineers, aerospace engineers, earth movers, and military personnel both tactical and strategic. Structural industries concerned with ground-contact equipment become increasingly dependent on statistics of soil characteristics for their equipment designs, and especially since static and dynamic structures tend to get heavier and taller, and since the most desirable soil areas tend to be occupied first, leaving more marginal soils as the only ones left to work on and with. Moreover, the rapidly increasing demand for greater mobility of a highly industrialized and densely populated society makes soil mechanics an important science and increases the need for reliable information regarding the characteristics and suitability of the varying types of terrain encountered.

2. The Prior Art

The closest prior art known to the applicant is his own Pat. No. 3,552,194, issued Jan. 5, 1971, reissued July 17, 1973 as Re 27,696; Pat. No. 3,465,576 issued Sept. 9, 1969 to Paul L. Spanski; and Pat. No. 3,116,633 issued Jan. 7, 1964 to Gerald T. Cohron.

SUMMARY OF THE INVENTION

A device to test and measure the shear strength of soil in situ comprises a basic support for the device, which basic support is itself mounted on the soil being tested and measured. A soil engaging instrument is carried by the basic support, by means of a pressure fluid motor connected to exert downward pressure on the instrument. The instrument is rotated by a helical cam and cam-follower mechanism actuated by down pressure on a pair of handles exerted through a resilient mechanism which varies the rotational effort directly as the operator presses down on the handles. A recording mechanism marks a chart to show soil shear strength (resistance to rotation of the soil engaging instrument) as a function of vertical load exerted on the instrument by the fluid motor.

The recording mechanism comprises a support, a cylindrical drum slotted throughout a substantial portion of its length and mounted on the support to oscillate about its cylindrical axis, a spring biasing the drum in one angular direction about its axis; a force to be recorded drives the drum in the opposite angular direction about its axis, a stylus carrier is mounted to move on a track parallel to the drum axis and holds a stylus in contact with the drum, a variable second force to be measured is connected to move the stylus carrier on its track, and means are provided to mount a strip chart and include a supply spool and a take-up spool in the drum, the chart passing from the supply spool through the slot, around the drum, and back through the slot onto the take-up spool.

THE DRAWINGS

DETAILED DESCRIPTION

Figure 1:
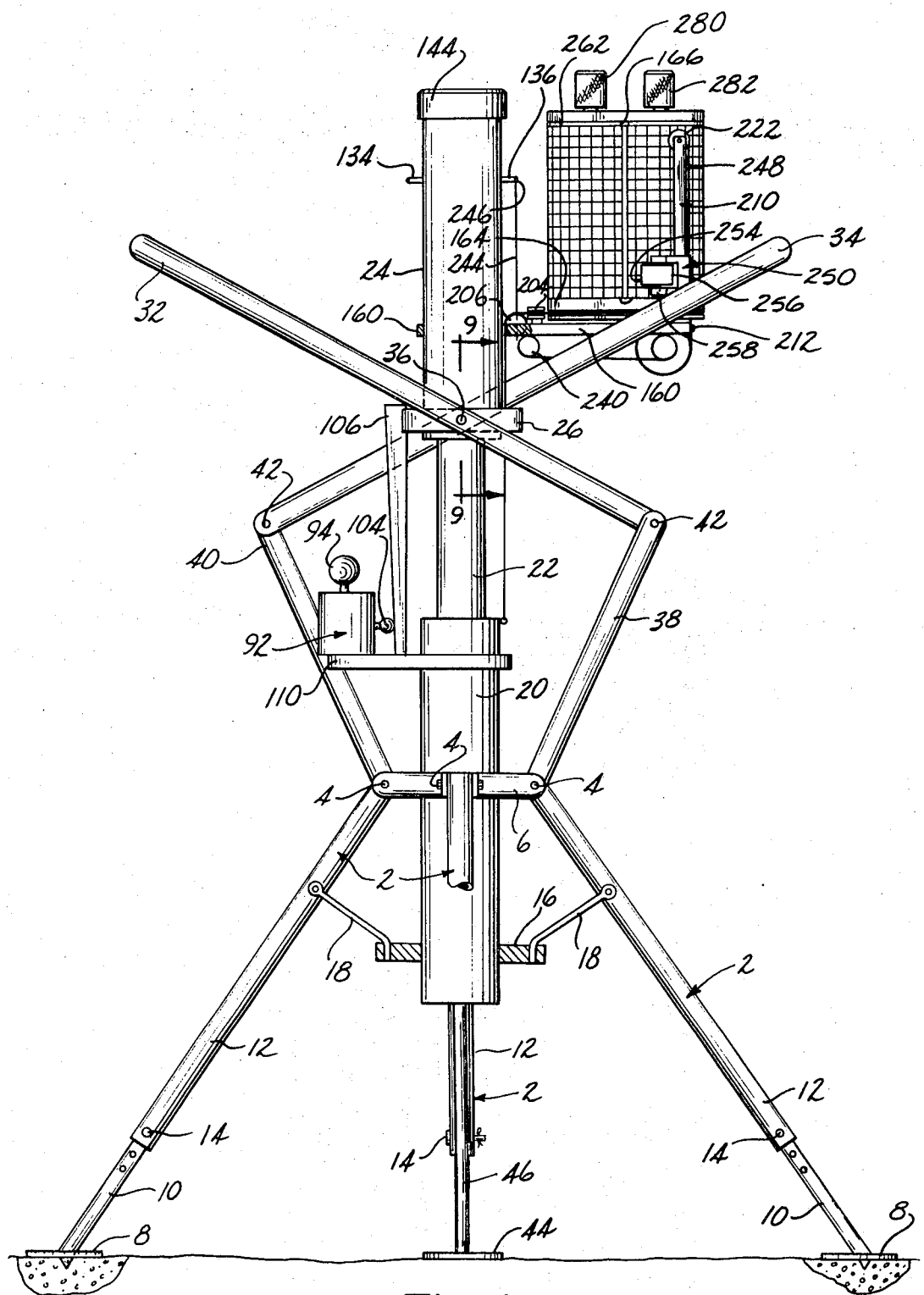
FIG. 1 is a front elevation view of a soil tester embodying the invention, with parts broken away and in section to show details.
Figure 2:
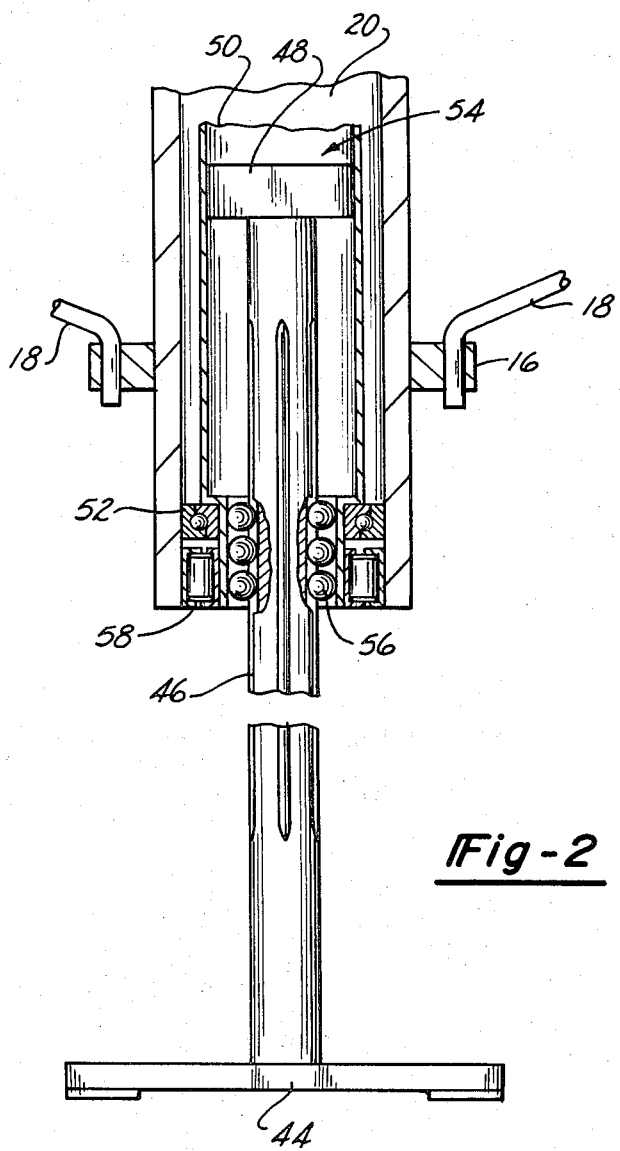
FIGS. 2, 3 and 4 are enlarged views in section of the structure shown in elevation in FIG. 1.

As best seen in FIG. 1, a quadripod comprises a first means adapted to be supported by the soil being tested, and is made up of four telescoping legs 2, having upper ends hingedly secured at 4 to a mounting ring or collar 6, and lower ends fitted with suitable ground-engaging pads or feet 8. Each telescoping leg 2 is conveniently made up of an inner leg element 10 telescopingly engaging an outer leg element 12. Elements 10 and 12 are held in a selected position by a pin 14 engaging suitable holes in the two leg elements.

A lower collar 16 is engaged by a hook 18 provided on each outer leg 12. Collars 6 and 16 are secured in any suitable manner to a cylinder 20 which has telescoping engagement with a second, smaller, cylinder 22. Cylinder 22 in turn telescopingly engages a third cylinder 24.

A collar 26 is secured to cylinder 24 and provides pivots for operator-operable levers.

The lower ends of levers 32 and 34 pivotally engage the upper ends of links 38 and 40 respectively by means of pivot pins 42. The lower ends of links 38 and 40 engage the pivots 4 of two of the legs 2 of the quadripod.

A soil tester made according to this invention includes a soil-engaging instrument 44 carried at the lower end of a rod 46. Means to apply a downward load on instrument 44 are provided, and to that end an expansible chamber device includes a suitably packed piston 48 on the upper end of rod 46, and a cylinder 50 rotatably mounted in cylinder 20 by means of combination radial and axial thrust, antifriction, bearings 52. Piston 48 and cylinder 50 thus constitute a fluid pressure motor indicated as an assembly by 54.

Means for rotating instrument 44 are provided and include antifriction splines 56 which permit sliding of rod 46 relative to cylinder 50 but prevent relative rotation, whereby a torque applied to cylinder 50 drives rod 46 and instrument 44. If desired, the lower end of cylinder 50 may be given additional radial support by an antifriction bearing 58.

At its upper end, cylinder 50 is secured to a flange 60 on a helical cam element 62 which is provided with a central bore 64 throughout its length. The external cylindrical surface is provided with a helical cam 66 which, in the embodiment shown, is two helical grooves formed in the surfaces. The cam follower of this cam mechanism comprises two rollers 68 riding in the grooves. Rollers 68 are rotatably mounted on cylinder 22 by means of pins 70. Cylinder 22 carries two other rollers 72 which ride in slots 74 in cylinder 20. As here shown, cylinder 22 carries rollers 72 by means of pins 76. A bushing 78 on the lower end of cylinder 22 cooperates with another bushing 80 in the upper end of cylinder 20 to keep cylinders 20 and 22 in axial alignment.

Slots 74 in cylinder 20 are parallel to the cylinder axis and serve to hold cylinder 22 against the rotation which would occur in response to the torque on cylinder 22 imposed by rollers 68 riding in the grooves which form cam surfaces 66. Thus, rollers 72 riding in slots 74 to provide the reaction force which compels cam element 62 to rotate, driving cylinder 50, rod 46, and instrument 44.

Bore 64 at its upper end is connected with a hose 82 which forms a bight 84 in the upper end of cylinder 22, passes through a slot 86, and connects with a pressure fitting 88 in cylinder 24. One end of a hose 90 is connected with fitting 88, and its other end is connected with a pressure regulator 92 having a gage 94 and an input T 96. A source of air under pressure is connected with T 96 by means of a hose 98, and an accumulator 100 is conventionally connected with regulator 92.

The pressure of the air delivered by regulator 92 to hose 90 is controlled by a suitable control valve, not shown, which is positioned by an actuator 102 carrying a cam follower 104. Follower 104 is conventionally biased into valve-closed position by a spring, not shown, and is moved against the bias of the spring by a cam 106 which is wedge-shaped and is grooved as at 108 to provide a track for cam follower 104.

Pressure regulator 92 may conveniently be mounted on a bracket or plate 110 which is held in place on cylinder 20 by a set screw 112. Plate 110 is provided with an aperture 114 to receive wedge-shaped cam 106. Aperture 114 is big enough in the plane of FIG. 3 to enable the desired actuation of cam follower 104.

Cam 106 is secured (FIG. 4) at its upper end to a boss 116 on cylinder 24 by means of a mounting tab 118 pivotally secured at 120 to cam 106 and a mounting screw 122 passing freely through tab 118 and having threaded engagement with boss 116. Jam nuts 124 hold screw 122 in a selected position and another jam nut 126 holds screw 122 against turning in boss 116. Collar 26 is preferably cut away at 128 to avoid interference with cam 106.

As noted above, cylinders 22 and 24 have a telescoping engagement, and bushings 130 and 132 maintain axial alignment of the cylinders during telescoping movement. The cylinders are held against relative angular movement by a pin and slot arrangement, here shown as pins 134 and 136 in the upper end of cylinder 22 engaging slots 138 and 140 in cylinder 24. A spring 142 is seated between a cap 144 on the upper end of cylinder 24 and a combination spring guide and seat which bears against the top of cylinder 22. More specifically, the combination guide and seat is mushroom-shaped to provide the lower seat 146 secured to an elongated guide or stem 148 which engages an apertured boss 150 in cap 144. A projection 152 on the combination guide and seat engages an opening 154 in the top of cylinder 22.

Reference will now be made to FIGS. 4–8 inclusive for a detailed description of the recording mechanism disclosed and claimed.

A bracket 160 is apertured as at 162 to receive cylinder 24 to be supported thereby, being secured in any suitable conventional manner. Bracket 160, in turn, serves as a base or support for a drum 164 which is slotted throughout a major portion of its axial length as shown at 166.

The recording mechanism here disclosed and claimed produces a "written" or "permanent" record, conventionally referred to as a "chart" and usually made of paper. The chart is mounted on the drum in a manner to be described and is moved by the drum. To accomplish the desired movement, means are provided to rotate the drum about its cylindrical axis 168, including a pin 170 secured in bracket 160, as for example by an interference fit. Pin 170 is provided with a suitably secured collar 172 which is disposed adjacent to the upper surface of bracket 160. The upper end of pin 170 is preferably square as shown at 174; see especially FIG. 5, wherein the cover of the recording mechanism is broken away to show the shape of pin end 174 in a top plan view.

Drum 164 is provided with a base 176, to which it is secured as by screws, one of which is shown at 178. Base 176 is centrally apertured to receive a flanged bearing bushing 180, of which flange 182 engages the lower face of base 176. A hub 184 is secured to the upper face of base 176 and surrounds bushing 180. A helical spring 186 is disposed in tension between hub 184 and a plate 188, being secured at its ends to hub 184 and plate 188 in any suitable manner. Plate 188 is provided centrally with a square opening to receive square end 174. A collar 190 is secured to pin 170 below square end 174 by a set screw 192.

The external cylindrical surface of base 176 is grooved as shown at 194 to receive a flexible cord 196 wrapped around the base and dead-ended at a suitable location on the periphery. By "suitable" is meant enough to enable rotation of drum 164 between stops 198 and 200. Stop 198 is here shown as secured to the underside of base 176, and stop 200 to the upper surface of bracket 160. As seen in FIG. 6, stop 200 is "in front of" stop 198, and the two stops touch; in FIG. 5, wherein the stops are shown as hidden by other structure, it can be seen that releasing cord 196 will rotate drum 164 clockwise, at which time stop 198 will move away from stop 200, and is in fact able to move through an arc approaching 360° until the stops again make contact, but at a virtually diametrically opposite point from the point of contact shown in FIG. 5.

Cord 196 wraps around drum 196 counterclockwise from its dead-end point such as point 202 in groove 194 and leaves the groove tangentially at or close to the same point 202. Then cord 196 wraps around a pulley 204 which is mounted to rotate about an axis perpendicular to bracket 160 so that cord 196 approaches and leaves pulley 204 in a plane parallel to bracket 160.

Figure 3:
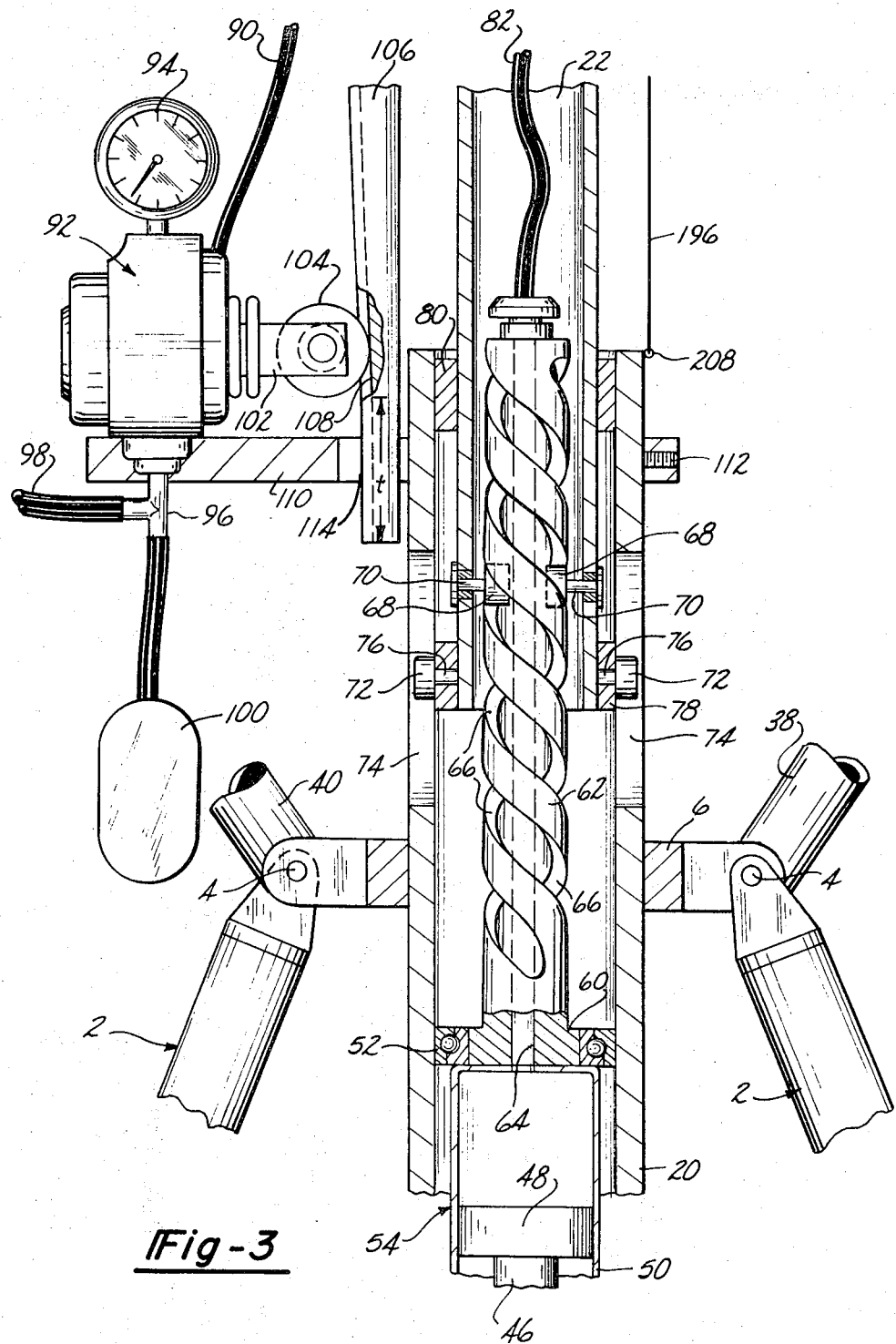

From pulley 204, cord 196 wraps around a pulley 206 which rotates about an axis parallel to the surface of bracket 160 and parallel to the aforesaid plane of approach and departure of the cord with respect to pulley 204. Cord 196 leaves pulley 206 in the downward direction as seen in FIG. 6, passes through an opening in collar 26, and is secured to cylinder 20 at 208 as can be seen in FIG. 3.

Figure 5:
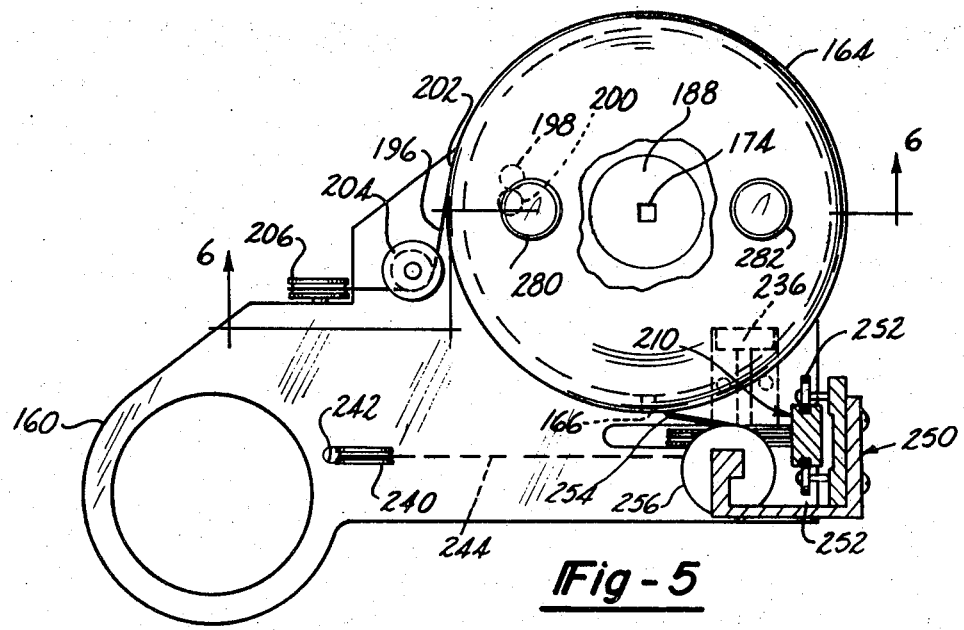
FIG. 5 is a top plan view of the recording device.
Figure 6:
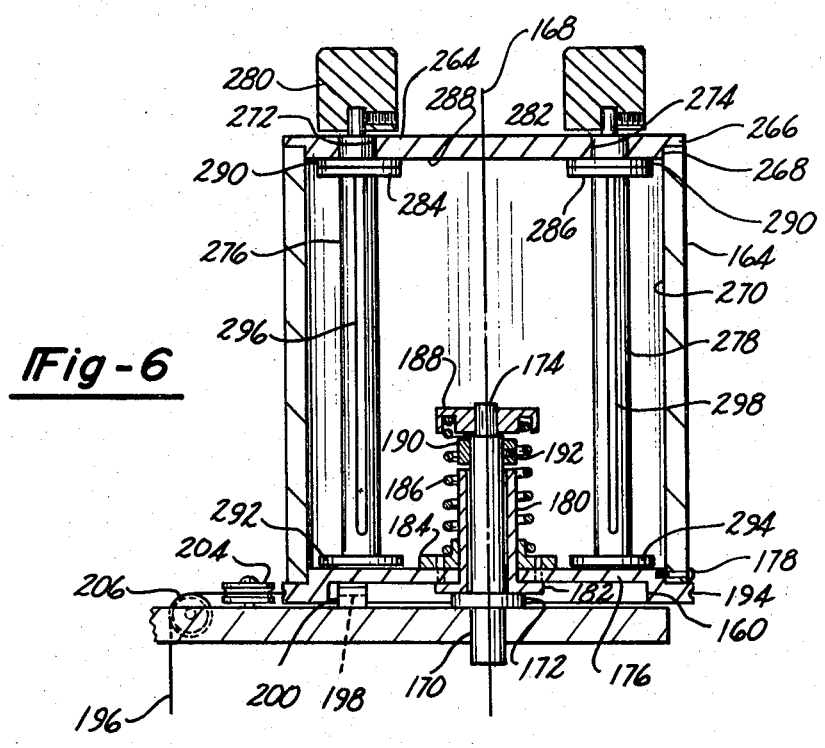
FIG. 6 is a view in section substantially on line 6 — 6 of FIG. 5.
Figure 7:
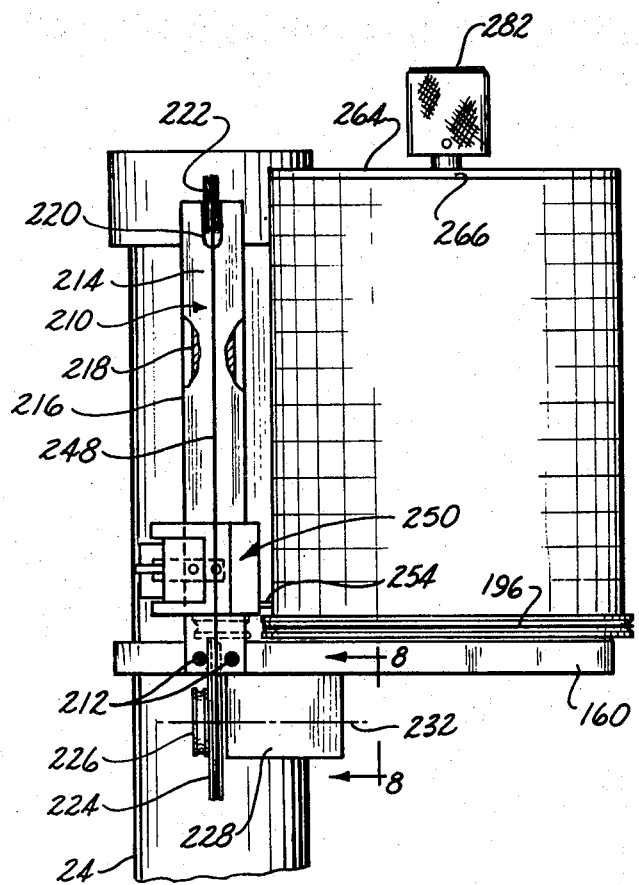
FIG. 7 is a side elevation view of the recorder, being from the right side as seen in FIG. 5.
Figure 8:
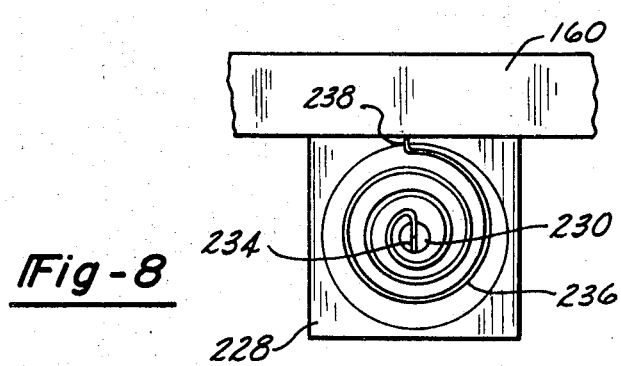
FIG. 8 is an enlarged elevation view from the plane of line 8 — of FIG. 7.

Track-providing means 210, comprising an elongated element having grooves in opposed edges, can best be seen in FIGS. 5 and 7, secured to bracket 160 by screws 212. More specifically, an element 214 has opposed edges 216 in which are formed grooves 218, giving element 214 an H shape as seen in top plan (FIG. 5). The upper end of element 214 is slotted as at 220 to receive a pulley 222 rotatably mounted in slot 220.

A cluster of two pulleys 224 and 226 is mounted below bracket 160 by means of a spring motor housing 228, on a shaft 230 having an axis of rotation 232. Pulley 224 is coplanar with pulley 222, and pulley 226 rotates in a plane parallel to the plane of rotation of pulleys 222 and 224. Pulleys 224 and 226 are joined together and are secured to shaft 230, which is slotted to receive one end 234 of a spring 236, of which its remaining end 238 is secured to the underside of bracket 160. Still another pulley 240, coplanar with pulley 226, is mounted beneath bracket 160 and aligned with a slot 242 in the bracket.

A flexible cord 244 is dead-ended on pin 136 (FIG. 4) by a screw 246, passes around pulley 240 after passing through slot 242, and then wraps around pulley 226 several times and is eventually dead-ended or anchored on pulley 226.

Still another flexible cord 248 is dead-ended or anchored on and wraps around pulley 224, extends upward and passes over pulley 222, extends downward to and is dead-ended on a stylus carrier 250.

Stylus carrier 250 is adapted to move vertically on track-providing means 210, and to that end rotatably carries rollers 252 which run in grooves 218 in track-providing means 210. Carrier 250 mounts a stylus 254 by means of a reservoir 256 pivotally supported on a C-shaped frame 258 which forms a part of the carrier. A spring 260 is secured to frame 258 and contacts stylus 254 to bias the stylus against the surface of drum 164, and thus into inking contact with a chart 262 wrapped around the drum.

Figure 4:
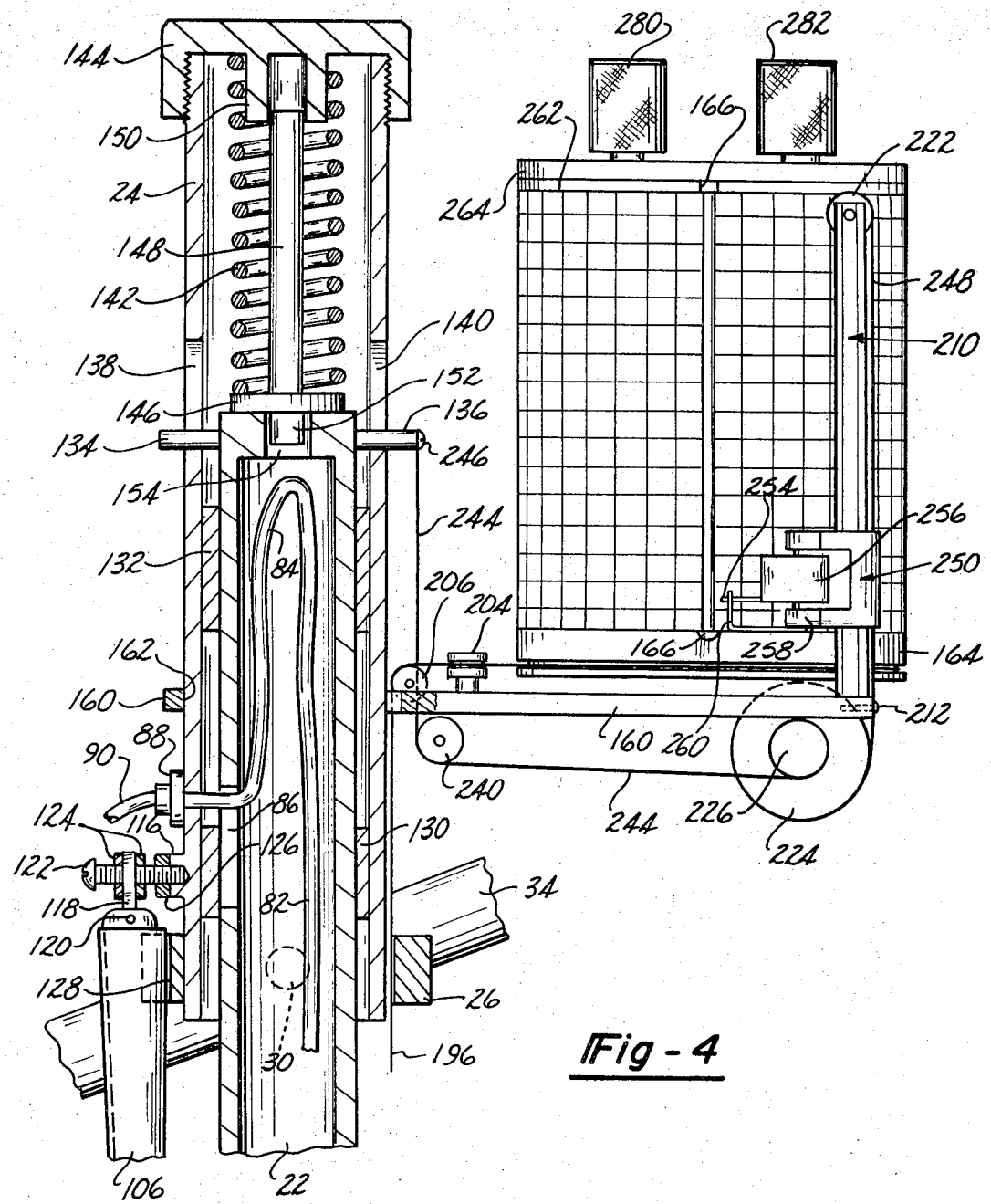

FIG. 4 shows the recording means with a chart 262 in place wrapped around drum 164. In order to provide a better view of the structure, the chart is omitted from FIGS. 5–7.

As indicated above, drum 164 is slotted at 166 so that chart 262 may take the form of a continuous strip, fed from a supply spool inside the drum, out to the drum surface through slot 166, around the surface back to the slot, through the slot, and onto a take-up spool inside the drum.

Slot 166 is open-mouthed at the upper end of drum 164, and this construction gives the drum resilience in the radial direction, especially at its upper end. The opening at the upper end of drum 164 is adapted to be closed by a cover 264 having a stepped periphery to provide two substantially cylindrical surfaces 266 and 268. As is best seen in FIG. 6, surface 266 coincides with the external surface of drum 164, and cover surface 268 coincides with the internal surface 270 of drum 164. The dimensions of drum 164 and cover 264 are such that the resilience given to drum 164 by slot 166 permits cover 264 to engage the drum in a sliding fit, providing enough friction between surface 268 on cover 264 and surface 270 of drum 164 to prevent accidental displacement of cover 264. When a strip chart is in place around the outside of drum 164, the aforesaid sliding fit is aided by the frictional engagement of the drum by the chart.

As is best seen in FIG. 6, cover 264 is provided with two openings 272 and 274 to receive the upper ends of spools 276 and 278 respectively. The portions of spools 276 and 278 which extend above cover 264 are preferably of a smaller diameter to engage suitable bores in knobs 280 and 282, the knobs being here shown as held in place by set screws.

Collars 284 and 286 are secured to spools 276 and 278 respectively, and are spaced from the inner surface 288 to permit the use of friction washers 290 between collars 284, 286 and surface 288. Washers 290 are of a material such as cork, rubber, or the like, to aid in keeping spools 276 and 278 in a given position.

The space between collars 284, 286 and surface 288 is adjustable to some extent by the fact that knobs 280 and 282 can be adjusted longitudinally on the upper ends of their spools to compensate for wear of the friction washers 290. After the washers are worn so as to offer no useful resistance to slip of the spools relative to cover 264 when the space the washers occupy is a minimum, then the worn washer or washers should be replaced.

At their lower ends, spools 276 and 278 are provided with other collars 292 and 294, respectively. Lower-end collars 292 and 294 hold the strip chart off the base 176 and help to maintain alignment of the chart with plot 166. Spools 276 and 278 are slotted as at 296 and 298 respectively to receive the free ends of the strip chart for more secure winding onto the spools.

OPERATION

To be sure that helical spring 186 is loaded throughout the operating stroke of drum 164, it is suggested that a preferred method of operation winds this spring through a distance greater than the arc through which drum 164 normally rotates. To provide further assurance that drum 164 rotates against spring tension throughout its operating arc, spring 186 is secured in such a way as to provide for a preload on the spring with cord 196 detached from its dead-end 208.

Thus, plate 188 is provided with a non-circular aperture to engage the non-circular end 174 of pin 170. In the drawings, drum 164 is shown in the position it occupies when the soil tester is ready to begin operating, but the operator has to put the drum into that position. The operator starts with the drum in a position not shown, namely with the drum turned clockwise so that, as seen in FIG. 5, stop 198 would be below stop 200, and as seen in FIG. 6, stop 198 would be in front of stop 200. Moreover, the stops should be in contact under the influence of spring 186.

If the operator finds "play" or space between stops 198 and 200 (with no tension in cord 196), he lifts plate 188 to disengage it from non-circular end 174 and turns the plate counterclockwise just enough to renengage the plate and the pin end. If the non-circular configuration is a square, the operator should try counterclockwise positions at 90° intervals until he achieves an engagement such that spring 186 provides enough clockwise bias to drum 164 to keep stops 198 and 200 engaged, there being no tension at this time in cord 196.

Next, the operator pulls cord 196 down as seen in FIG. 3, rotating drum 164 counterclockwise as seen in FIG. 5 until stops 198 and 200 are again in contact in the position seen in FIG. 5, and fastens cord 196 to the dead-end 208 shown in FIG. 3. The tension in cord 196 should be no more required to contact stops 198 and 200, so that relative movement of cylinder 24 toward dead-end 208 immediately begins clockwise rotation of drum 164 under the influence of spring 186.

Attention is now directed to steps taken to put stylus carrier 250 into its starting position. Theoretically, spiral spring 236 should not be required to keep carrier 250 responsive to the tension in cord 244 because cord 244 is connected to lift carrier 250 against gravity. However, the gravity bias is usually small because the parts involved are small. Also, there is static friction in the means to mount the rotatable elements. These and other factors indicate the advisability of using some means such as spring 236 to oppose the pull on cord 244, even though it does not effect cord 248.

As in the case of drum operation described above, stylus carrier 250 is here shown in the position the elements have when the soil tester is ready to begin a test run, and of course the operator or somebody acting for him has to put the parts into the illustrated position.

The soil tester is preferably stored, overnight or longer, with cords 196 and 244 disconnected. In the case of cord 244, pulley cluster 226, 224, cord 248, and carrier 250, this means that carrier 259 will be as far down as it can go in FIGS. 1, 4, and 7, i. e., resting on the upper surface of bracket 160, under the influence of spiral spring 236 and gravity. As will be understood by those skilled in the art, the influence of spring 236 on carrier 250 at this stage is limited to a complete relaxation of tension in cord 248 because pulley 224 and cord 248 are incapable of transmitting a compressive force to carrier 250. Accordingly, the system does depend on gravity between carrier 250 and pulley 224.

The operator puts the parts into the position shown in FIG. 4 by reaving cords 244 and 248 as shown, and then by pulling on cord 244 enough to lift carrier 250 so that the carrier is free of bracket 160 and so that stylus 254 is above the lower edge of chart 262, and secures cord 244 to cylinder 22 by means of dead-end 246. Spiral spring 236 is then under load and opposes further pull on cord 244.

Assuming that instrument 44 rests on a surface to be tested for its shear strength, the operator bears down on handles 32 and 34, in effect moving cylinder 24 down relative to cylinder 20. Such downward motion exerts a downward push on spring 142 (FIG. 4) and thus on cylinder 22. As is best seen in FIG. 3, cylinder 22 engages helical cam 66 by means of roller-cam followers 68. Rotation of cylinder 22 is prevented by rollers 72 riding in slots 74, so that downward movement of cylinder 22 is resisted by whatever resistance to rotation (shear) is offered by the soil on which instrument 44 rests. If the soil shear strength is enough to prevent rotation of instrument 44 and helical cam 66, the downward push on cylinder 24 compresses spring 142 and thus increases the downward force on cylinder 22 and the torsional effort on cam 66 and instrument 44 until the effort is great enough to overcome the resistance to shear of the soil.

As spring 142 compresses (FIG. 4), pin 136 moves upward relative to bracket 160, exerting a pull on cord 244 and lifting stylus carrier 250, so that the position of stylus 254 on chart 262 is a function of the shear strength of the soil being tested.

The resistance to shear of the soil is of course a function of the vertical load on instrument 44, which in turn is determined by the vertical component of the force exerted on the helical cams and normal thereto, and by the pressure in cylinder 54 acting on piston 48 (FIG. 3).

As cylinder 24 moves downward relative to cylinder 20, tapered cam 106 moves downward and cams the follower 104 (FIG. 3) leftward, opening valve 92 and admitting a greater pressure to cylinder 54, thus increasing the load on soil engaging instrument 44 and altering the resistance to shear of the soil.

As the stated relative movement between cylinders 24 and 20 occurs to shorten the distance between them, dead-end 208 at the upper end of cylinder 20 moves closer to bracket 160, and drum 164 rotates clockwise (FIG. 5) under the influence of helical spring 186 (FIG. 6), as cord 196 winds around drum 164 in groove 194. The further cam 106 moves downward as seen in FIGS. 3 and 4, the greater the opening of valve 92, the greater the arc through which drum 164 turns; because the resulting increase in pressure in cylinder 54 loads soil engaging instrument 44 more heavily, and the arc of rotation of drum 164 increases in proportion, it will be understood by those skilled in the art that the position of stylus 254 on chart 262 is a function of the vertical load on instrument 44.

Figure 9:
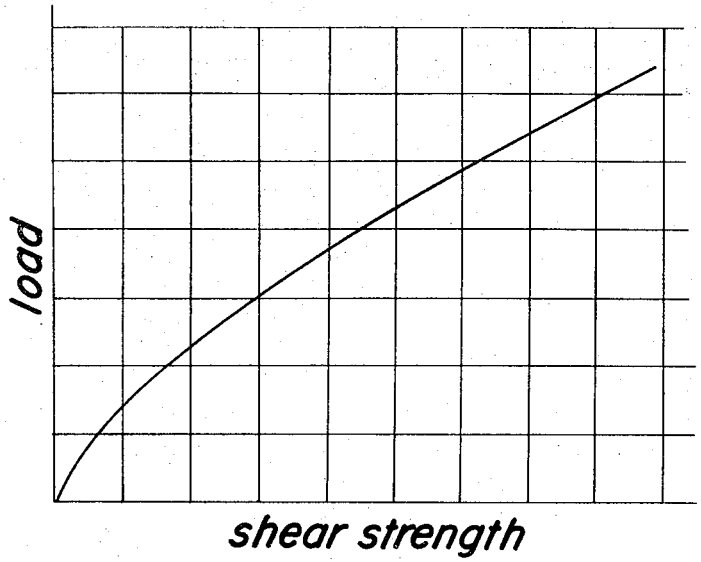
FIG. 9 is a graph showing a sample record of the type that can be produced by the recording device of this invention.

FIG. 9 is a sample of the type of curve drawn by stylus 254 on chart 262, showing shear strength plotted against load. The vertical axis of the curve shows the load on instrument 44, and the horizontal axis is a measure of the shear strength of the soil, with the resulting curve providing information regarding soil shear strength at various loads.

Figure 10:
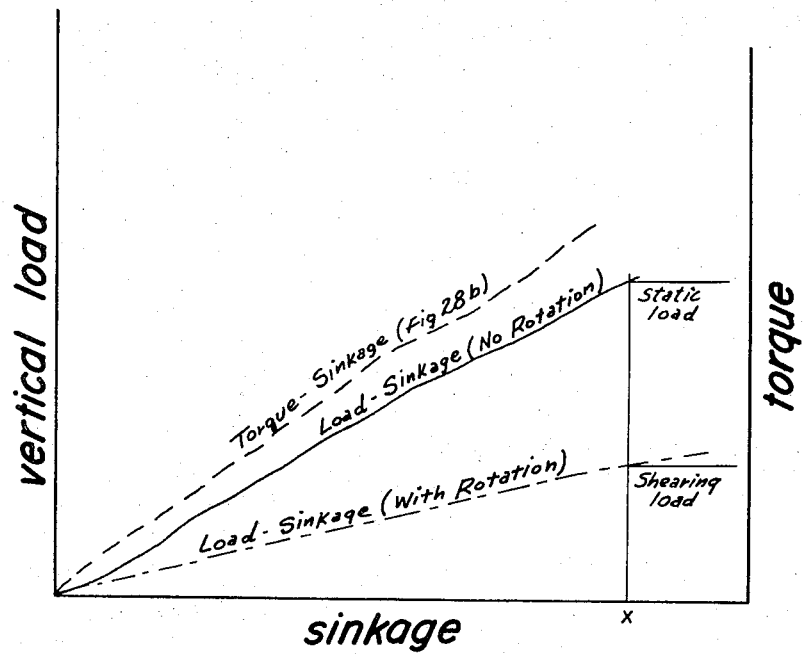
FIG. 10 is a graph showing three sample records such as can be produced by my prior art soil tester shown in Pat. No. 3,552,194, now reissued as Re 27,696.

FIG. 10 provides three samples of the type of information provided by my prior art soil tester disclosed and claimed in my Pat. No. 3,552,194. FIG. 10 is given here to show the differences between my present invention and in general and my prior art soil tester in particular, I incorporate by reference the doctoral thesis of Dr. Bong-sing Chang, titled "A Method of Predicting the Soft Soil Performance of Off Road Vehicles," available from *University Microfilms Library Services*, P. O. Box 1346, Ann Arbor, Mich., 48106, reference *Dissertation Abstracts International* for Dec. 1971, Volume 32, No. 6, page 3337B.

In FIG. 10, the dash-dash line is the curve obtained by operating my prior art device so that the soil-engaging instrument rotates while it is pushed into the ground. This curve shows the torque (right side vertical axis) needed to rotate the instrument at any given distance from the surface (called "Sinkage") and shown by the horizontal axis. This curve is substantially a copy of a curve shown at FIG. 28b of said dissertation.

The solid line on the FIG. 10 graph is the curve obtained by operating my prior art tester with no rotation of the soil-engaging instrument. This curve shows vertical load (left side vertical axis) at any given distance from the surface, called Sinkage and having values shown by the horizontal axis. This curve is substantially a copy of a curve shown at FIG. 28a of said dissertation.

The dash-dot-dash line on the FIG. 10 graph is here presented to illustrate the difference between rotation and no rotation of the soil-engaging instrument. This curve also shows the vertical load necessary to penetrate the soil at a given depth from the surface, but with the soil-engaging instrument rotating. Thus, at $x$ inches depth, it can readily be seen that the soil will support a much higher static load than one that contacts the soil with a shearing action. The dash-dot-dash curve in FIG. 15 is not a reproduction of an actual test curve, but is a typical curve of the type discussed.

A key difference between my prior art tester and my present invention is that my prior art tester is intended to penetrate the soil (sinkage), whereas my present invention is primarily concerned with the measurement of soil shear strength without regard to penetration. For example, it may be desirable to measure the shear strength of a concrete road. It will be apparent that the soil tester here disclosed and claimed will effect substantially zero penetration, but also that it can very readily determine the shear strength of the road at various loads.

Reference was made above to the downward movement of handles 32 and 34 as being necessary to effect rotation of instrument 44 and that the force on cylinder 22 is increased by compression of spring 142 (due of course to spring 142 having a positive spring rate). It will also be recalled that diminution of the distance between cylinders 24 and 20 increases the vertical load on instrument 44, which has the effect of increasing the resistance to sheer of the soil being tested. If it should turn out that spring 142 goes solid without achieving rotation of instrument 44, the operator will know that the initial pressure in cylinder 54 (with handles 32 and 34 fully raised) is too high and will take steps to reduce that initial pressure. In the usual situation, if the initial pressure in cylinder 54 is not too high, instrument 44 will turn with a minimum of force applied to handles 32 and 34. Furthermore, to minimize the chances of such an impasse, the lower end of cam 106 may be constructed to have zero taper for a short distance $t$, as shown, to enable increase in the force transmitted by spring 142 for such distance without increasing the pressure in cylinder 54.

FEATURES OF THE INVENTION

This invention is concerned particularly with the recording mechanism shown best in FIGS. 4 through 7. As seen in FIG. 6, the removable end closure 264 serves as a mounting means for the supply spool and take-up spool; this arrangement enables the closure-spool assembly to be removed from the drum as a unit, as for example during replacement of marked chart strip with new unmarked chart strip. Insertion of a new strip into the drum is accomplished after a portion of the strip length is first loosely wound from the supply spool onto the take-up spool; then the closure is lowered onto the drum to cause the loose portion of the chart strip to move downwardly through slot 166 in the drum side wall. Manual knobs 280, 282 may be turned to tighten the strip chart on the outside circumference of the drum or to adjust the starting position of the chart, or to back up the marked chart for reading purposes, or to advance the chart to expose new chart surface. Friction washers 290 tend to retain the spools in their adjusted positions, thereby maintaining the chart strip in a taut condition on the drum except when knobs 280, 282 are turned manually.

The "top access" provided by removable closure 264 requires that the space above the closure be vacant or structurally unencumbered. Therefore the stylus means at 250, 254 is mounted for vertical movement along a track 210 that is laterally offset from drum 164; i. e., neither the track nor its mounting means overhangs the drum. The stylus enjoys a fairly long stroke (in the vertical direction) by reason of the movement-multiplying nature of its connection with the condition-responsive member 136 (FIG. 4). Motion-multiplication is obtained by reason of the multiple flexible cords 244 and 248 anchored to the small and large diameter pulleys 226 and 224. Ordinarily the vertical stroke of member 136 relative to cylinder 24 is comparatively small so that some magnification of member 136 movement is quite desirable in order to obtain a readable and representative marking on the chart. The tensioned elements 244 and 248 form a relatively simple low cost structure for this purpose. The tensioned nature of the structure tends to eliminate play or lost motion, thereby improving the accuracy of response without great expense.

I wish it to be understood that I do not desire to be limited to the exact details of construction shown and described, for obvious modifications will occur to a person skilled in the art.

I claim:

1. A recording mechanism comprising a rotatable drum having a removable closure for one of its ends; longitudinal slot means in the drum side wall extending from the aforementioned removable closure for a substantial portion of the drum length; chart strip storage means comprising a supply spool and a take-up spool rotatably mounted on the removable closure for disposition within the drum; an externally accessible manual operator connected to at least the take-up spool for turning same to cause the chart strip to wind off the supply spool, through the slot means, around the circumference of the drum, and back through the slot means onto the take-up spool; the aforementioned closure and spools being removable from the drum as a unit to remove and replace the chart, the longitudinal slot means having a mouth communicating with said one end of the drum to accommodate movement of the chart strip into the slot means during the chart replacement process.

2. A recording mechanism comprising a chart-supporting drum rotatable on a vertical axis to advance a strip chart past a chart-making stylus means; condition-responsive means operatively connected to the stylus means to move same parallel to the drum axis; and flexible motion-multiplying means interposed between the condition-responsive means and stylus means; said motion-multiplying means including a first flexible tension member trained between the condition-responsive means and an anchorage on a relatively small diameter pulley, and a second flexible tension member trained between the stylus means and an anchorage on a second relatively large diameter pulley; said pulleys being mounted for conjoint rotary motion, whereby a given movement of the condition-responsive means produces a magnified movement of the stylus means; the aforementioned stylus means being mounted for up-and-down movement on a vertical track; said second flexible tension element extending from the large diameter pulley upwardly alongside the track, thence over a motion-redirecting guide means, thence downwardly to the stylus means; the upper end of the drum being provided with a removable closure; said drum having a vertical slot means in its side wall extending downwardly from its upper end; said drum having internal chart strip storage means comprising a supply spool and a take-up spool rotatably mounted on the removable closure for disposition within the drum; and an externally accessible manual operator for turning the take-up spool to enable the chart strip to wind off the supply spool, through the slot means, around the circumference of the drum, and back through the slot means onto the take-up spool; the aforementioned closure and spools being removable from the drum as a unit to remove and replace the chart, the vertical slot means having a mouth communicating with the upper end of the drum to accommodate movement of the chart strip into the slot means during the chart replacement process.

* * * * *